United States Patent
Kuroiwa et al.

(10) Patent No.: US 8,213,764 B2
(45) Date of Patent: Jul. 3, 2012

(54) INFORMATION PROCESSING APPARATUS, METHOD AND PROGRAM

(75) Inventors: Tatsuo Kuroiwa, Tokyo (JP); Masachika Sasaki, Kanagawa (JP); Satoshi Fujimura, Kanagawa (JP); Hisashi Hosaka, Tokyo (JP); Hiroshi Nagatani, Tokyo (JP); Yuki Murata, Tokyo (JP); Satoshi Akagawa, Tokyo (JP); Shigeya Yasui, Kanagawa (JP); Yoshiyasu Kubota, Kanagawa (JP); Yukiko Sakata, Tokyo (JP); Mitsuo Okumura, Tokyo (JP); Masahide Sumiyoshi, Tokyo (JP); Toshiaki Kusakabe, Tokyo (JP); Masahiro Hara, Tokyo (JP); Masanori Nomura, Tokyo (JP); Satoshi Hiroi, Chiba (JP); Bin Lin, Kanagawa (JP)

(73) Assignee: Sony Corporation, Tokyo (JP)

( * ) Notice: Subject to any disclaimer, the term of this patent is extended or adjusted under 35 U.S.C. 154(b) by 1221 days.

(21) Appl. No.: 11/948,569

(22) Filed: Nov. 30, 2007

(65) Prior Publication Data
US 2008/0159718 A1    Jul. 3, 2008

(30) Foreign Application Priority Data
Dec. 27, 2006 (JP) .................................. 2006-352362

(51) Int. Cl.
*H04N 5/932* (2006.01)
*H04N 5/935* (2006.01)

(52) U.S. Cl. ....................................... 386/219; 348/700

(58) Field of Classification Search .................. 386/124, 386/219
See application file for complete search history.

(56) References Cited

U.S. PATENT DOCUMENTS

| | | | |
|---|---|---|---|
| 6,571,054 B1 * | 5/2003 | Tonomura et al. | 386/241 |
| 7,024,038 B2 | 4/2006 | Kondo et al. | |
| 7,136,527 B2 | 11/2006 | Ikeda et al. | |
| 7,519,264 B2 * | 4/2009 | Miyasato et al. | 386/239 |
| 7,809,300 B2 * | 10/2010 | Saeki et al. | 399/82 |
| 2003/0161610 A1 * | 8/2003 | Miyazawa et al. | 386/69 |
| 2004/0228616 A1 * | 11/2004 | Miyasato et al. | 386/83 |
| 2005/0210388 A1 | 9/2005 | Matsumoto | |
| 2005/0223034 A1 * | 10/2005 | Kaneko et al. | 707/104.1 |
| 2009/0066845 A1 * | 3/2009 | Okuda | 348/700 |

FOREIGN PATENT DOCUMENTS

| | | |
|---|---|---|
| CN | 1665293 A | 9/2005 |
| JP | 7-192003 | 7/1995 |
| JP | 2001-218158 | 8/2001 |
| JP | 2002-27411 | 1/2002 |
| JP | 2002-84458 | 3/2002 |
| JP | 2004-72504 | 3/2004 |
| JP | 2004-80156 | 3/2004 |
| JP | 2004-318256 | 11/2004 |
| JP | 2004-364234 | 12/2004 |

(Continued)

*Primary Examiner* — Kambiz Zand
*Assistant Examiner* — Dant Shaifer Harriman
(74) *Attorney, Agent, or Firm* — Oblon, Spivak, McClelland, Maier & Neustadt, L.L.P.

(57) ABSTRACT

An information processing apparatus includes area image extracting means for extracting, as a telop image, an area displaying a telop in contents, detecting means for detecting a scene change in images of the contents, recording means for converting an image at the time when a scene change is detected by the detecting means to a thumbnail image and recording the thumbnail image, display control means for controlling to arrange and display a plurality of the thumbnail images and a plurality of the telop images chronologically, and playing means for playing the contents from the position corresponding to the selected thumbnail image or telop image.

16 Claims, 9 Drawing Sheets

FOREIGN PATENT DOCUMENTS

| | | |
|---|---|---|
| JP | 2005-303743 | 10/2005 |
| JP | 2006-74514 | 3/2006 |
| WO | WO 2006/068269 | 6/2006 |
| WO | WO 2006/126391 | 11/2006 |

* cited by examiner

INFORMATION PROCESSING APPARATUS, METHOD AND PROGRAM

CROSS REFERENCES TO RELATED APPLICATIONS

The present invention contains subject matter related to Japanese Patent Applications JP 2006-352362 filed in the Japanese Patent Office on Dec. 27, 2006, the entire contents of which being incorporated herein by reference.

BACKGROUND OF THE INVENTION

1. Field of the Invention

The present invention relates to an information processing apparatus, method and program and, in particular, to an information processing apparatus, method and program allowing easily and accurately locating a desired position to play to play recorded contents.

2. Description of the Related Art

A technology has been widely spread which allows the easy recognition of the position to play and the playback of recorded contents from an arbitrary playback position.

As the technology for playing recorded contents as described above, a technology has been proposed that chronologically displays images corresponding to playback positions in recorded contents as thumbnail images and causes to play the recorded contents from the playback position corresponding to a selected arbitrary thumbnail image (refer to JP-A-2005-303743 (Patent Document 1)).

Another technology has been proposed that extracts a telop image for easy recognition of a playback position in contents (refer to JP-A-2004-318256, JP-A-2004-072504 and JP-A-2002-084458 (Patent Documents 2 to 4).

SUMMARY OF THE INVENTION

In a case where images each corresponding to a playback position in recorded contents as described above are chronologically placed as thumbnail images, the choices of playback positions are determined by how the image to be converted to a thumbnail image is selected.

In other words, in a case where a thumbnail image for locating a playback position is created for each predetermined period of time, it may be difficult that a thumbnail image properly represents a desired playback position in contents.

In other words, in a case where a thumbnail image is created at a playback position upon scene change among images included in contents, the playback position upon scene change out of context of the contents may be selected for creating a thumbnail image. Thus, a thumbnail image may be created out of context of the contents. Therefore, the position where a thumbnail image is created does not agree with the position where the topic is changed. As a result, it is difficult to find out an intended playback position and to start playing contents from the intended playback position.

Accordingly, it is desirable to allow easily and accurately locating a desired playback position to start playing recorded contents by extracting a telop image itself as a thumbnail image at a playback position for displaying the telop image among images included in the recorded contents and displaying the thumbnail image in connection with the playback position so that the context of the contents can be recognized from information included in the telop image created as the thumbnail image and the playback position can be located.

According to an embodiment of the invention, there is provided an information processing apparatus including area image extracting means for extracting, as a telop image, an area displaying a telop in contents, detecting means for detecting a scene change in images of the contents, recording means for converting an image at the time when a scene change is detected by the detecting means to a thumbnail image and recording the thumbnail image, display control means for controlling to arrange and display a plurality of the thumbnail images and a plurality of the telop images chronologically, and playing means for playing the contents from the position corresponding to the selected thumbnail image or telop image.

The area image extracting means may extract, as a telop image, the image of an area that does not change for a predetermined period of time in a predetermined range in images of contents.

The display control means may control to display the contents being currently played and the telop image on one screen.

The display control means may control to display the telop image corresponding to the selected contents in a plurality of contents pieces.

The display control means may control to move and display the thumbnail image and the telop image in synchronization with the playback of the contents.

According to another embodiment of the invention, there is provided an information processing method including an area image extracting step of extracting, as a telop image, an area displaying a telop in contents, a detecting step of detecting a scene change in images of the contents, a recording step of converting an image at the time when a scene change is detected by the detecting step to a thumbnail image and recording the thumbnail image, a display control step of controlling to arrange and display a plurality of the thumbnail images and a plurality of the telop images chronologically, and a playing step of playing the contents from the position corresponding to the selected thumbnail image or telop image.

The display control step may control to display the telop image corresponding to the selected contents in a plurality of contents pieces.

The display control step may control to move and display the thumbnail image and the telop image in synchronization with the playback of the contents.

According to another embodiment of the invention, there is provided a program causing a computer to perform processing including an area image extracting step of extracting, as a telop image, an area displaying a telop in contents, a detecting step of detecting a scene change in images of the contents, a recording step of converting an image at the time when a scene change is detected by the detecting step to a thumbnail image and recording the thumbnail image, a display control step of controlling to arrange and display a plurality of the thumbnail images and a plurality of the telop images chronologically, and a playing step of playing the contents from the position corresponding to the selected thumbnail image or telop image.

The display control step may control to display the telop image corresponding to the selected contents in a plurality of contents pieces.

The display control step may control to move and display the thumbnail image and the telop image in synchronization with the playback of the contents.

An information processing apparatus, method and program according to the embodiments of the invention may include extracting areas each displaying a telop in contents as telop images, displaying the telop images and playing the contents from the position corresponding to a selected one of the telop images.

An information processing apparatus according to the embodiment of the invention may be an independent apparatus or a block that performs information processing.

The embodiments of the invention may allow easily and accurately locating a desired playback position in recorded contents to play the contents.

DESCRIPTION OF THE PREFERRED EMBODIMENTS

Embodiments of the invention will be described below where the correspondence between constituent features of the invention and embodiments described in the specification or drawings will be illustrated as follows. This description is for confirming that embodiments supporting the invention are described in the specification or drawings. Therefore, the existence of an embodiment described in the specification or drawings but not described herein as an embodiment corresponding to a constituent feature of the invention does not mean that the embodiment does not correspond to the constituent feature. Conversely, the existence of an embodiment described herein as one corresponding to a constituent feature does not means that the embodiment does not correspond to other constituent features excluding the constituent feature.

This description further does not mean the entire invention described in the specification. In other words, this description does not deny the existence of the invention described in the specification but is not claimed in the present application, that is, the existence of the invention, which will be divisionally applied or appear or be added by correction.

Figure 1:
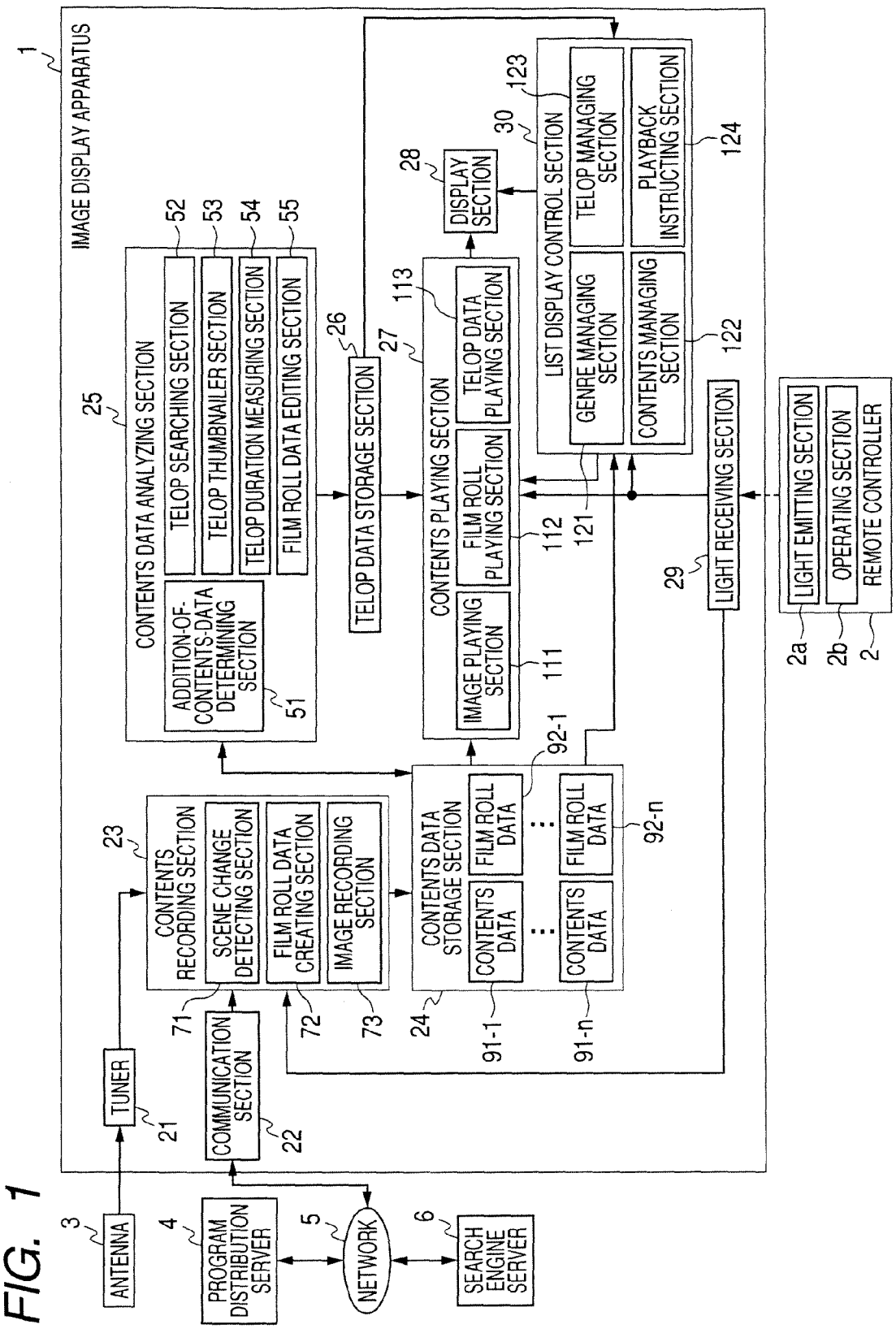
FIG. 1 is a block diagram showing a configuration example of an embodiment of an image display apparatus according to an embodiment of the invention.

In other words, an information processing apparatus according to an embodiment of the invention includes area image extracting means (such as a telop searching section 52 in FIG. 1) for extracting, as a telop image, an area displaying a telop in contents, detecting means (such as a scene change detecting section 71) for detecting a scene change in images of the contents, recording means (such as an image recording section 73 in FIG. 1) for converting an image at the time when a scene change is detected by the detecting means to a thumbnail image and recording the thumbnail image, display control means (such as a telop data playing section 113 of a contents playing section 27 in FIG. 1) for controlling to arrange and display a plurality of the thumbnail images and a plurality of the telop images chronologically, and playing means (such as an image playing section 111 in FIG. 1) for playing the contents from the position corresponding to the selected thumbnail image or telop image.

The area image extracting means (such as the telop searching section 52 in FIG. 1) may extract, as a telop image, the image of an area that does not change for a predetermined period of time in a predetermined range in images of contents.

The display control means (such as a telop data playing section 113 of a contents playing section 27 in FIG. 1) may control to display the contents being currently played and the telop image on one screen.

The display control means (such as a telop data playing section 113 of a contents playing section 27 in FIG. 1) may control to display the telop image corresponding to the selected contents in a plurality of contents pieces.

The display control means (such as a telop data playing section 113 of a contents playing section 27 in FIG. 1) may control to move and display the thumbnail image and the telop image in synchronization with the playback of the contents.

According to another embodiment of the invention, there is provided an information processing method and program including an area image extracting step (such as a step S25 in FIG. 3) of extracting, as a telop image, an area displaying a telop in contents, a detecting step of detecting a scene change in images of the contents, a recording step of converting an image at the time when a scene change is detected by the detecting step to a thumbnail image and recording the thumbnail image, a display control step (such as a step S52 in FIG. 6) of controlling to arrange and display a plurality of the thumbnail images and a plurality of the telop images chronologically, and a playing step (such as a step S60 in FIG. 6) of playing the contents from the position corresponding to the selected thumbnail image or telop image.

FIG. 1 shows a configuration example of an embodiment of an image display apparatus the invention is applied.

An image display apparatus 1 may be a television receiver, for example. The image display apparatus 1 may be operated through a remote controller 2 and receives and displays contents distributed by broadcast waves from a broadcast station, not shown, through an antenna 3 and records or plays contents. The image display apparatus 1 obtains and displays contents distributed from a program distribution server 4 over a network 5 such as the Internet typically and records or plays the contents.

A contents recording section 23 may be controlled through the remote controller 2 and adjusts a tuner 21 to a predetermined channel, receives a program (contents) distributed from a broadcast station, not shown, as broadcast waves through the antenna 3 and causes a contents data storage section 24 including an HDD (hard disk drive) to store it as contents data 91. The contents recording section 23 further controls a communication section 22 to cause the contents data storage section 24 to store contents distributed from the program distribution server 4 over the network 5 as contents data 91.

In order to record contents, the contents recording section 23 controls a scene change detecting section 71 to detect the time upon scene change in frames and supplies the detection result to a film roll data creating section 72. The film roll data creating section 72 converts the image of the frame immediately after the scene change corresponding to the time code of the time upon scene change to a thumbnail image and records the result to film roll data 92 and stores the film roll data 92 in the contents data storage section 24 in connection with the contents data 91. The image recording section 73 causes the contents data storage section 24 to store information on the contents obtained by the contents recording section 23 as contents data.

Thus, the contents data storage section 24 stores contents data 91-1 to 91-n and stores film roll data 92-1 to 92-n in connection therewith, respectively. The film roll data 92 will be described in detail. The contents data 91-1 to 91-n and film roll data 92-1 to 92-n will be simply called contents data 91 and film roll data 92, respectively, if the distinction among them is not important. The same is true in others.

After new contents data 91 is stored in the contents data storage section 24, a contents data analyzing section 25 analyzes the stored contents data 91, extracts and stores telop data therefrom to a telop data storage section 26 and edits the corresponding film roll data 92.

An addition-of-contents-data determining section 51 of the contents data analyzing section 25 monitors the contents data storage section 24 at predetermined time intervals and determines whether new contents data 92 has been stored by recording or not.

If the addition-of-contents-data determining section 51 determines that contents data 92 is newly stored in the contents data storage section 24, a telop searching section 52 detects the image of the area displaying a telop in a predetermined range among images of the contents data 92 as a telop image and stores the detected telop image and the time codes of the display starting and finishing times of the telop to the telop data storage section 26 as telop data. The telop searching section 52 supplies the telop data to a telop thumbnailer section 53.

The word "telop" refers to one including text, a number and/or a symbol and/or a figure that decorates the text, number and/or symbol and distinctively expresses a description of contents, a description of a specific scene or a comment by a person appearing in contents. In a news program, the telop may be a title corresponding to a piece of news. One feature of a telop is that the display does not change for a predetermined period of time, compared with the development of contents.

The telop thumbnailer section 53 converts a telop image among supplied telop data to a thumbnail image and supplies the thumbnail image to a film roll data editing section 55 along with the time code information.

A telop duration measuring section 54 extracts the time code of the first frame from which a telop image is extracted and the time code where the telop image disappears from contents data 91 to be played and calculates the playback time.

The film roll data editing section 55 updates the film roll data 92 in the contents data storage section 24 by editing the thumbnail image resulting from the conversion of a telop image so as to incorporate into the film roll data 92 based on the time codes, like the thumbnail image upon scene change in the film roll data 92.

After an operating section 2b of the remote controller 2 is operated to select predetermined contents data and a light receiving section 29 receives a light emission signal, which indicates that the playback is instructed, from a light emitting section 2a, the contents playing section 27 controls an image playing section 111 to load and play the applicable contents data 91 from the contents data storage section 24 and controls a display section 28 including a CRT (Cathode Ray Tube) or an LCD (Liquid Crystal Display) to display it. The contents playing section 27 further controls a film roll playing section 112 to load the film roll data 92 corresponding to the contents data 91 and controls the display section 28 to display the thumbnail image of the time code recorded in the film roll data 92 like a film roll in synchronization with the time when the contents data 91 is sequentially played by the image playing section 111. The contents playing section 27 further controls a telop data playing section 113 to load telop data from the telop data storage section 26, arranges the telop images based on the time code chronologically and controls the display section 28 to display them.

After the operating section 2b of the remote controller 2 is operated to instruct list display and the light receiving section 29 receives a light emission signal, which indicates that the list display is instructed, from the light emitting section 2a, a list display control section 30 controls the display section 28 to display a list of contents. More specifically, a genre managing section 121 displays a list of genres for identifying contents. A contents managing section 122 accesses the contents data storage section 24, loads the contents data of the contents corresponding to a selected genre on the list of genres and displays the list of contents. A telop managing section 123 accesses the telop data storage section 26, loads telop images of the contents selected on the list of contents and displays a list of telop images. A playback instructing section 124 instructs the contents playing section 27 to play selected contents from the beginning if the contents data is selected on the list of contents and the playback is instructed. The playback instructing section 124 further instructs the contents playing section 27 to play contents data including a selected telop image from a selected telop position if the telop image is selected on a list of telop images and the playback is instructed.

Figure 2:
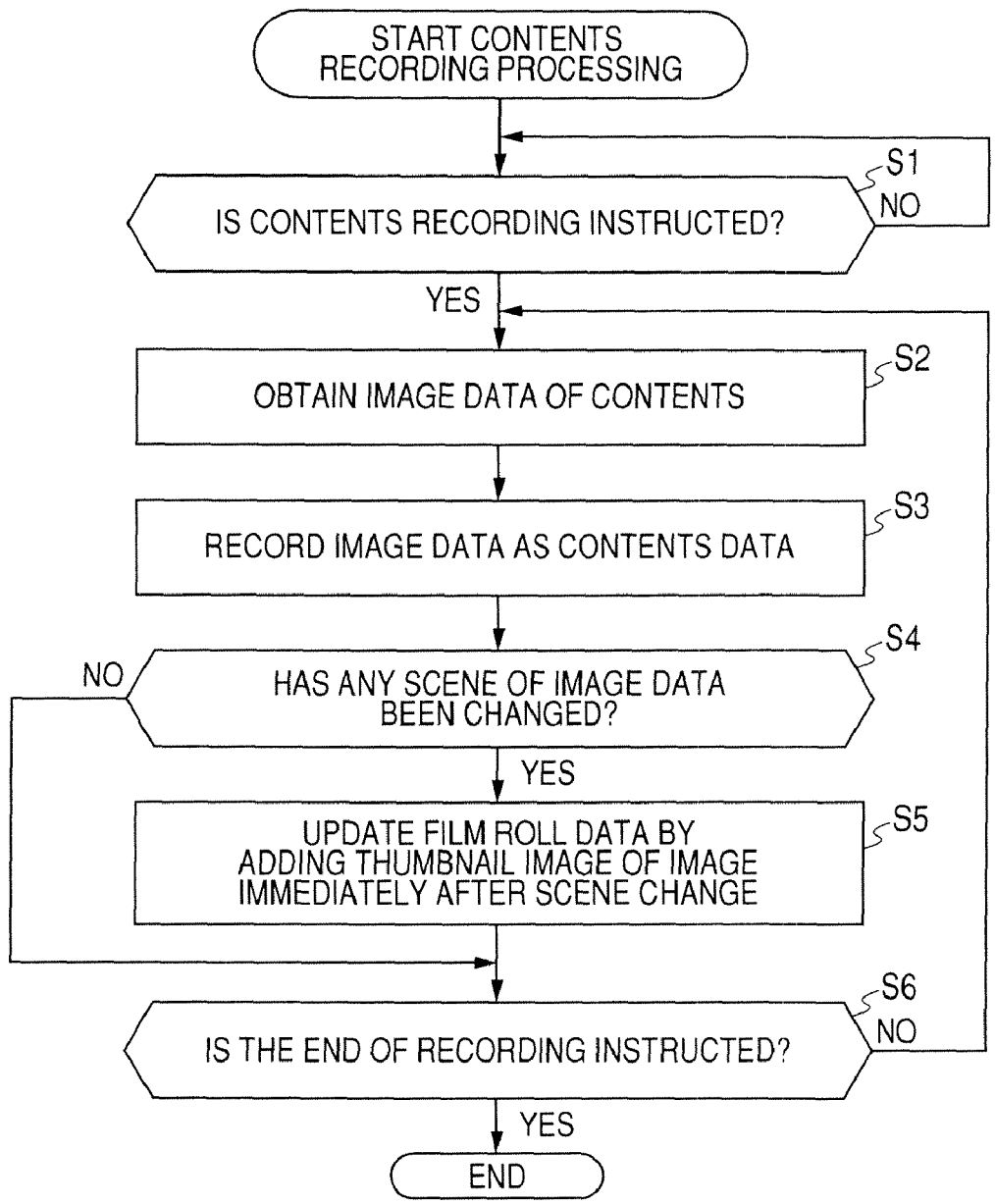
FIG. 2 is a flowchart describing contents recording processing.

With reference to the flowchart in FIG. 2, contents recording processing will be described next.

In step S1, the contents recording section 23 determines whether recording has been instructed or not based on a signal received from the light receiving section 29 and repeats the processing until recording is instructed. If the operating section 2b is operated to instruct the contents recording by a user, for example, in step S1, the light emitting section 2a emits the corresponding signal as a light emission signal. Here, the light receiving section 29 receives the light emission signal from the light emitting section 2a of the remote controller 2 and supplies the signal instructing to start recording, which corresponds to the received light signal, to the contents recording section 23. In response thereto, the contents recording section 23 determines that contents recording has been instructed, and the processing moves to step S2.

In step S2, the contents recording section 23 controls the tuner 21 to define a channel and obtains contents of broadcast waves received by the antenna 4 at the predetermined channel. The contents here is not limited to one distributed by broadcast waves, but the contents recording section 23 controls the communication section 22 to access a predetermined program distribution sever 4 over the network 5 and obtains contents, which has been distributed over the Internet, from the program distribution server 4.

In step S3, the contents recording section 23 controls the image recording section 73 to record image data (including audio data and genre information for identifying the contents) of the contents in the contents data storage section 24 as the contents data 91.

In step S4, the contents recording section 23 controls the scene change detecting section 71 to detect whether the obtained image data has any scene change in frames or not and determines whether any scene change exists or not. More specifically, the scene change detecting section 71 detects a scene change if the result from the addition of subtracted values between pixel values of the pixels at an identical position between adjacent frames changes largely.

If any scene change is detected in step S4, the film roll data creating section 72 in step S5 converts the image immediately after the scene change is detected to a thumbnail image, registers and updates the thumbnail image and the time code with the film roll data 92 upon playback and stores them in the contents data storage section 24. In other words, the image at the time when a scene change is detected is converted to a thumbnail image, and the thumbnail image and the time code are sequentially stored in the film roll data 92.

In step S6, the contents recording section 23 determines whether the ending of recording has been instructed or not or whether the distribution of contents has ended or not. If the ending has not been instructed, and contents is still being distributed, the processing returns to step S2. In other words, the processing in steps S2 to S6 is repeated from the time when contents recording is instructed until the ending of recording is instructed or distribution of contents ends.

Through the processing above, the contents data 91 and film roll data 92 of the contents instructed to record are stored in the contents data storage section 24.

Figure 3:
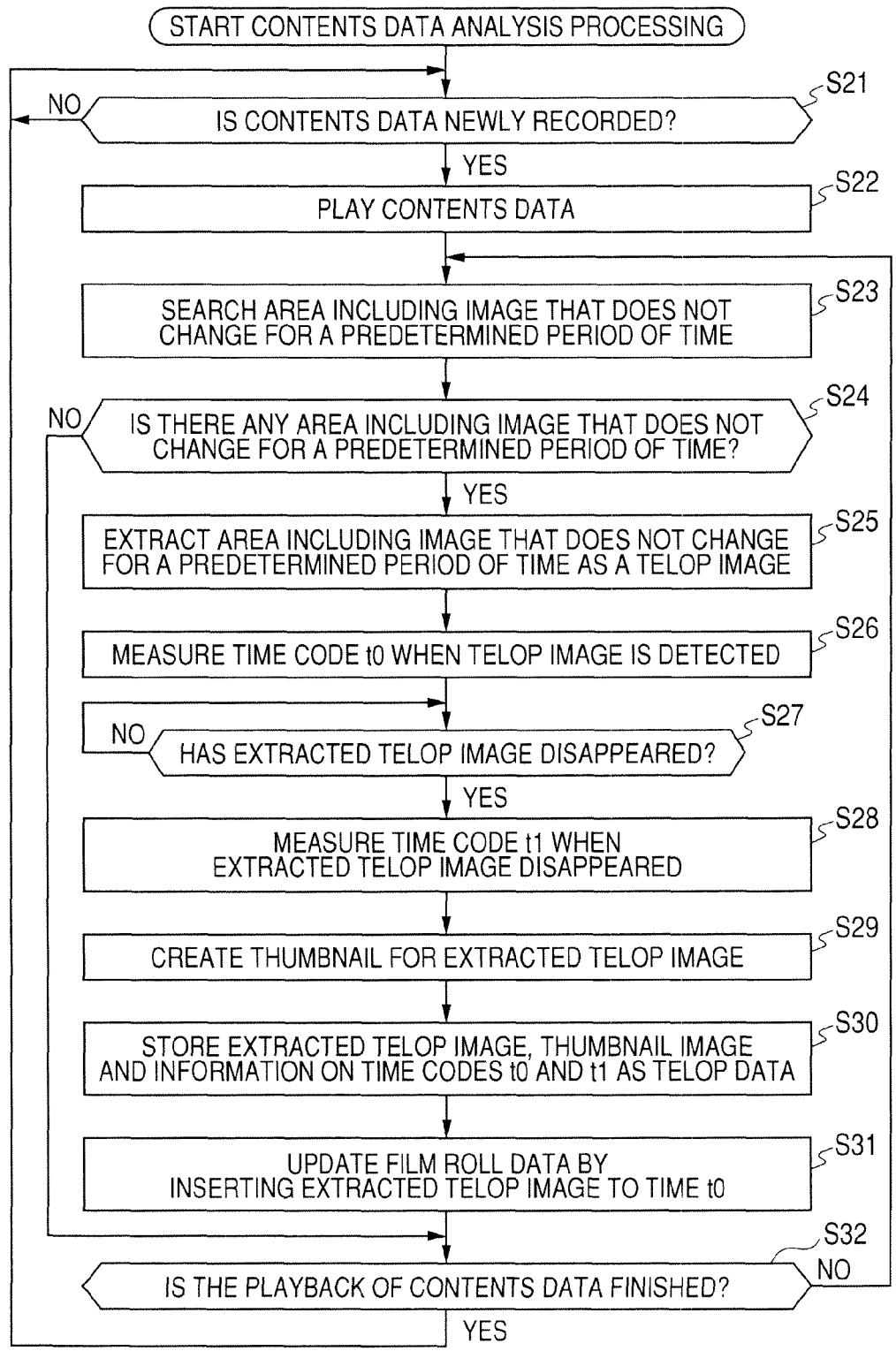
FIG. 3 is a flowchart describing contents data analyzing processing.

With reference to a flowchart in FIG. 3, contents data analyzing processing will be described next.

In step S21, the addition-of-contents-data determining section 51 of the contents data analyzing section 25 accesses the contents data storage section 24, determines whether new contents data has been recorded or not and repeats the same processing until new contents data is recorded. Step S21 determines that new contents data 92 has been recorded if the contents recording processing described with reference to the flowchart in FIG. 2 stores contents data 92 newly in the contents data storage section 24, for example, and processing moves to step S22.

The telop searching section 52 causes to play the newly recorded contents data 92 in step S22 and detects a rectangular area including a part that does not change for a predetermined period of time in a predetermined range of images of the played contents data in step S23. Then, in step S24, the telop searching section 52 determines whether any rectangular area including a part that does not change for the predetermined period of time is detected or not.

Figure 4:
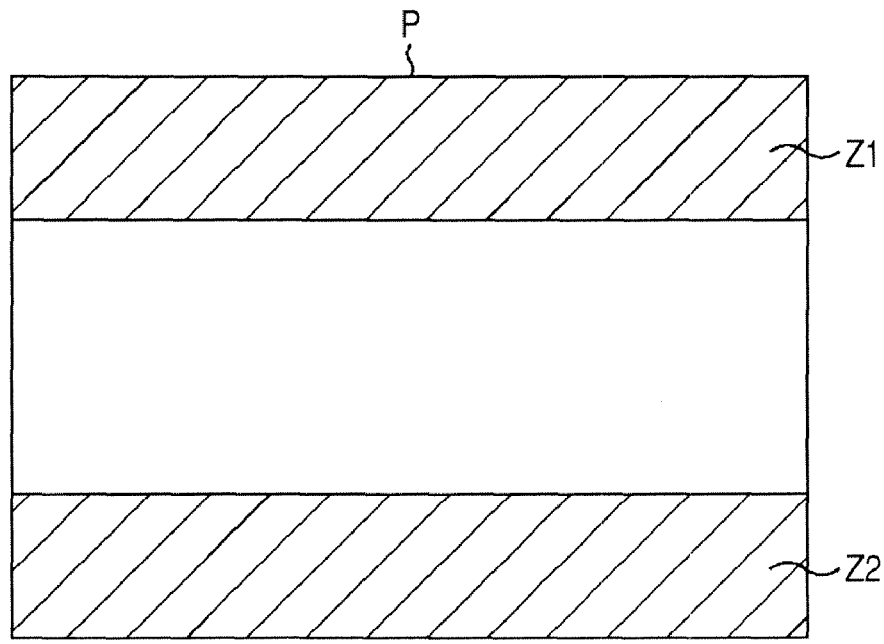
FIG. 4 is a diagram illustrating the range for searching a telop.
Figure 5:
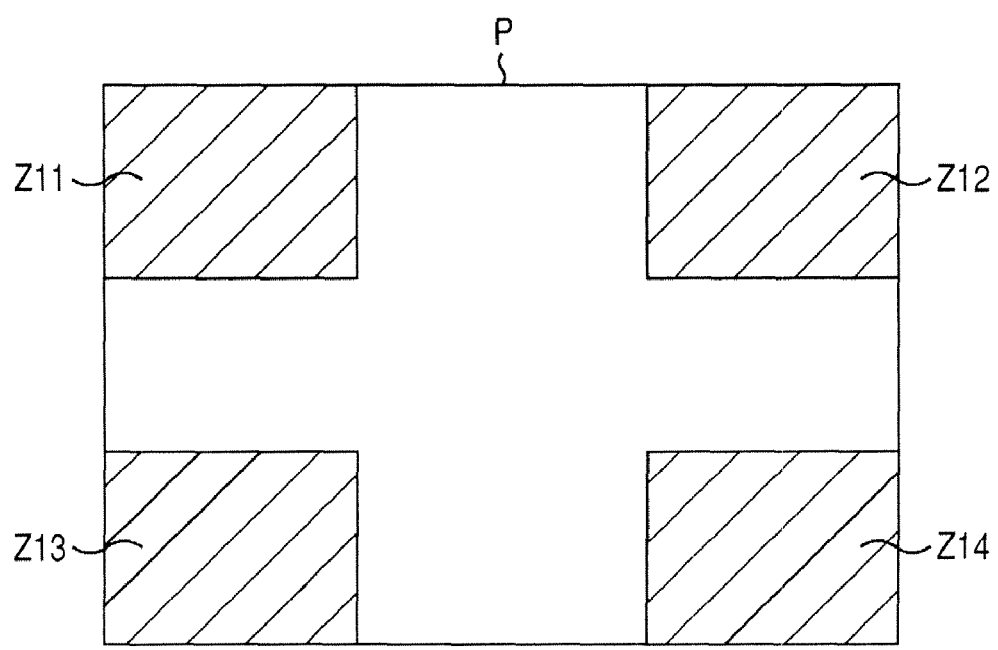
FIG. 5 is a diagram illustrating the range for searching a telop.

In other words, if a telop is displayed in played images when contents data is played, the telop part has a value 0 as a difference between pixel values of previous and subsequent frames. Then, the telop searching section 52 determines that the area including a telop image has been detected if a rectangular area including a part where the difference between pixel values is zero (0) in comparison with the previous and subsequent frames has been continuously detected for a predetermined period of time (such as 15 seconds) in a range where a telop is more easily displayed such as ranges Z1 and Z2 shaded in the image shown in FIG. 4 or ranges Z11 to Z14 shaded in the image shown in FIG. 5. Then, the processing moves to step S25.

In step S25, the telop searching section 52 extracts as a telop image the rectangular area in which the part where the difference between pixel values is zero (0) has been continuously detected in the comparison with previous and subsequent frames for a predetermined period of time.

In step S26, the telop duration measuring section 54 extracts and supplies the time code t0 of the image (frame) when the display of the detected telop image starts to the telop searching section 52.

In step S27, the telop duration measuring section 54 determines whether the display of the extracted telop image has been disappeared or not and repeats the same processing until the display disappears.

The telop duration measuring section 54 determines that the display of the telop image has been disappeared if the playback continues and the display of the telop disappears, for example, in step S27 and extracts and supplies the time code t1 of the frame when the display of the telop image disappears to the telop searching section 52 in step S28.

In step S29, the telop searching section 52 supplies the telop image to the telop thumbnailer section 53. The telop thumbnailer section 53 converts the supplied telop image to a thumbnail image and supplies the thumbnail image to the telop searching section 52.

In step S30, the telop searching section 52 stores the extracted telop image, the thumbnail image resulting from the conversion of the telop image and the time codes t0 and t1 in the telop data storage section 26 as telop data and supplies the telop data to the film roll data editing section 55.

In step S31, the film roll data editing section 55 loads the film roll data 92 corresponding to the contents data 91 newly stored in the contents data storage section 24 and edits and updates the thumbnail image resulting from the conversion of the telop image in connection with the time code t0.

In step S32, the telop searching section 52 determines whether the playback of the contents data has ended or not. If not, the processing returns to step S23. In other words, the processing in steps S23 to S32 is repeated until the playback of the newly registered contents data 91 has ended. Then, if the playback of the newly registered contents data 91 ends, the processing returns to step S21.

Through the processing above, the film roll data 92 stores the thumbnail image resulting from the conversion of the telop image in the newly recorded contents data 91 and the thumbnail image resulting from the conversion of the image at the time upon scene change both in connection with time codes. The telop data in the newly recorded contents data 91 is also stored in the telop data storage section 26.

Figure 6:
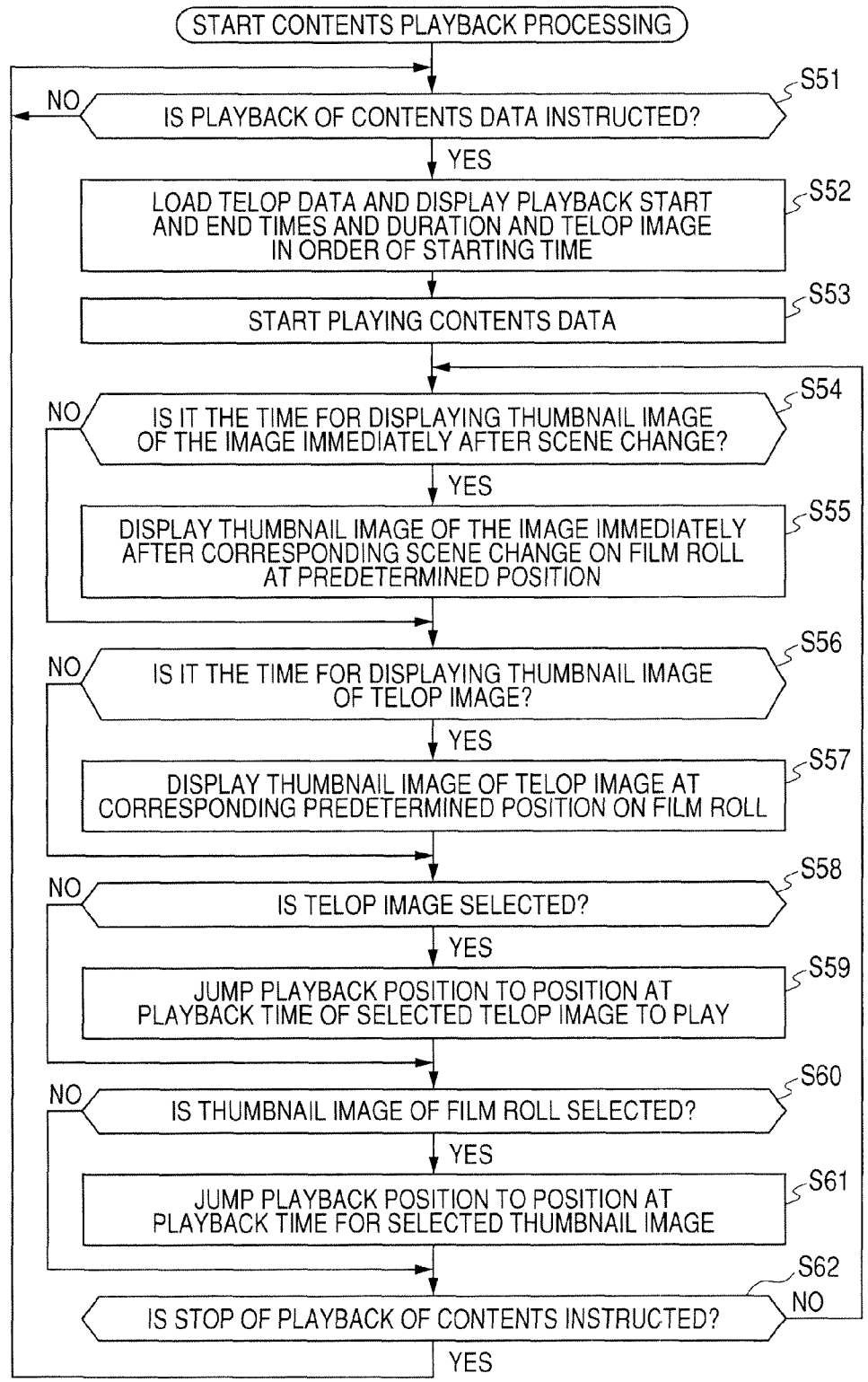
FIG. 6 is a flowchart describing contents playback processing.

With reference to the flowchart in FIG. 6, contents playback processing will be described next.

In step S51, the contents playing section 27 determines whether the playback of contents has been instructed or not based on the signal obtained by the light receiving section 29 and repeats the processing until playback is instructed. If the operating a section 2b is operated to instruct to play contents by a user, for example, instep S51, the light emitting section 2a emits the corresponding signal as a light emission signal. Here, the light receiving section 29 receives the light emission signal from the light emitting section 2a of the remote controller 2 and supplies the signal instructing to start playing contents, which corresponds to the received light signal, to the contents playing section 27. In response thereto, the contents playing section 27 determines that contents playback has been instructed, and the processing moves to step S52.

Figure 7:
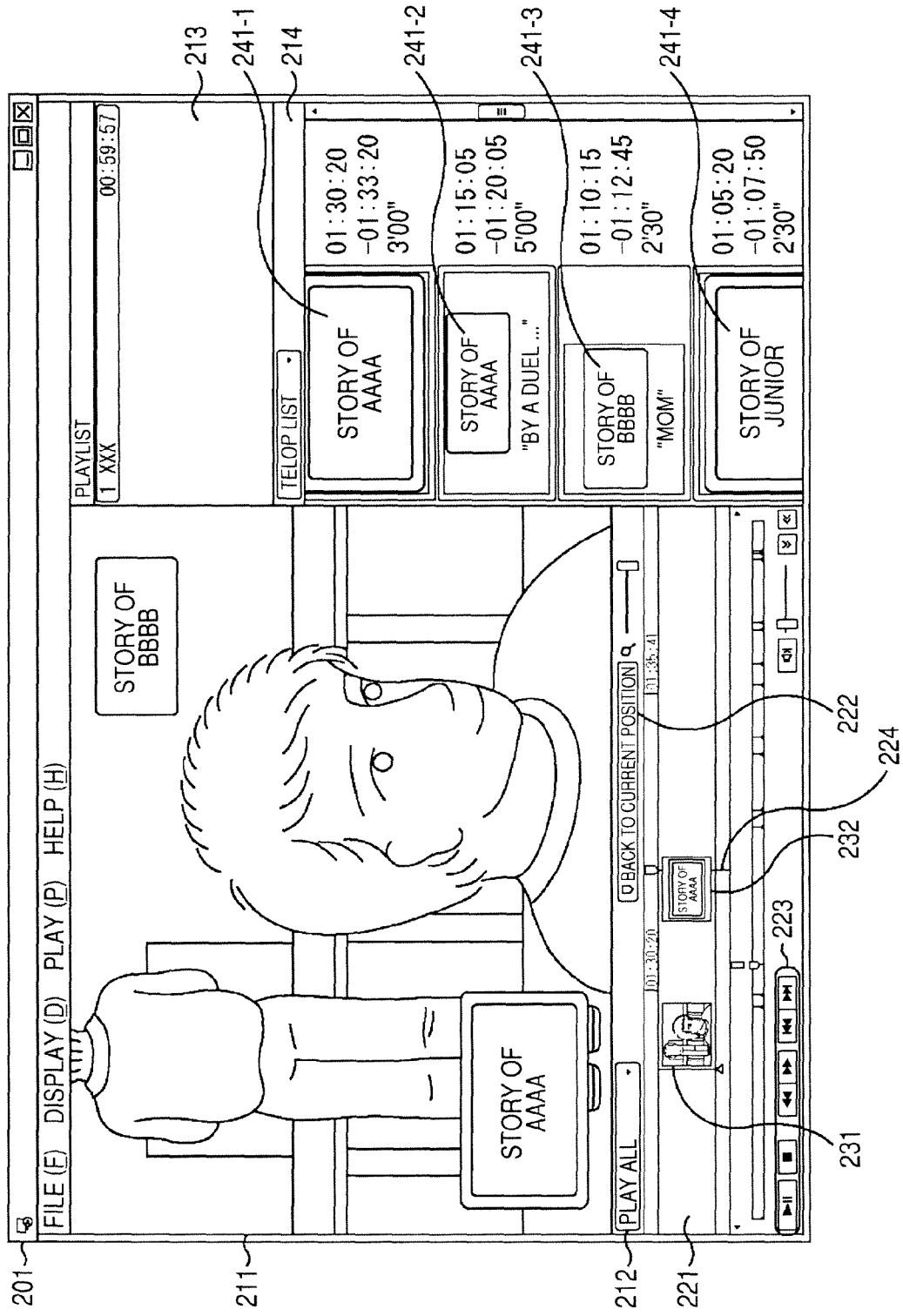
FIG. 7 is a diagram for describing an example of the window to be displayed by the contents playback processing.

In step S52, the contents playing section 27 controls the contents playing section 113 to load telop data stored in the telop data storage section 26 and controls the display section 28 to display a list of telop data chronologically based on information of time codes as shown in a telop list display section 214 in FIG. 7.

In FIG. 7, a window 201 is displayed, and the window 201 includes an image display section 211, a film roll display section 212, a playlist display section 213 and a telop list display section 214. The telop list display section 214 displays telop images 241-1 to 241-4 from the top.

The telop image 241-1 showing "STORY OF AAAA" is displayed at the top column of the telop list display section 214. The display starting time, display ending time and display period "01:30:20-01:33:20 3'00"" of the telop image 241-1 are shown on the right side, which indicates that the telop image 241-1 is displayed three minutes from the time 1:30:20 to the time 1:33:20.

The telop image 241-2 showing "STORY OF AAAA 'BY A DUEL . . . '" is displayed at the second column of the telop list display section 214. The display starting time, display ending time and display period "01:15:05-01:20:05 5'00"" of the telop image 241-2 are shown on the right side, which indicates that the telop image 241-2 is displayed five minutes from the time 1:15:05 to the time 1:20:05.

The telop image 241-3 showing "STORY OF BBBB 'MOM' " is displayed at the third column of the telop list display section 214. The display starting time, display ending time and display period "01:10:15-01:12:45 2'30"" of the telop image 241-3 are shown on the right side, which indicates that the telop image 241-3 is displayed two minutes and thirty seconds from the time 1:10:15 to the time 1:12:45.

The telop image 241-4 showing "STORY OF JUNIOR" is displayed at the fourth column of the telop list display section 214. The display starting time, display ending time and display period "01:05:20-01:07:50 2'30"" of the telop image 241-4 are shown on the right side, which indicates that the telop image 241-4 is displayed two minutes and thirty seconds from the time 1:05:20 to the time 1:07:50.

In this way, in the telop image list display section 214, telop images 241 are arranged chronologically, whereby when and which telop is to be displayed can be recognized at a glance. Furthermore, since the telop image 241 includes a large amount of information showing the current details of contents, when and what kind of contents of the entire contents is recorded can be recognized at a glance by checking the list.

In step S53, the contents playing section 27 controls the image playing section 111 to load the contents data 91 corresponding to the contents instructed to play and controls the display section 28 to display the contents data on the image display section 211 in FIG. 7, for example.

The image playing section 111 controls the image display section 211 to display an image of the contents recorded by the contents data 91. In this case, the contents playing section 27 displays the contents name of the contents data 91 being currently played on a playlist display column 213. In FIG. 7, a playlist display column 213 displays "XXX" as the name of the contents being currently played and displays "00:59:57" as the playback time.

In step S54, the film roll playing section 112 loads the film roll data 92 corresponding to the contents data 91 of the contents being currently played and may display a film roll screen 221, as shown on the film roll display section 212 in FIG. 7. The film roll playing section 112 further determines whether the current playback time is the time for displaying the thumbnail image after a scene change on the film roll display section 212 or not based on the time codes given to the thumbnail images of film roll data 92.

If so in step S54, the film roll playing section 112 controls the thumbnail image after a scene change at the applicable time code to be displayed on the film roll screen 221 under the film roll display section 212 in step S55. If not, the processing in step S55 is skipped.

In other words, as shown in FIG. 7, this processing displays the film roll screen 221 at the upper center under the film roll display section 212 and moves and displays the thumbnail image 231 after a scene change in the right to left direction in FIG. 7 based on the time codes with the advance of the playback. As shown in FIG. 7, the film roll display section 212 includes the film roll screen 221, a button 222, operation buttons 223 and a playback position indicating line 224. The time codes "01:30:20" and "01:35:41" for playback are displayed on the film roll screen 221 and shows that the time under the displayed times is the one corresponding to the playback positions of the contents data corresponding to the time codes. The current playback position is indicated by the playback position indicating line 224 at the center of the film roll screen 221.

By dragging the film roll screen 221 with a pointer, for example, the film roll screen 221 can be scrolled independent of the playback time of the contents data 91 to be played by the image display section 211. By operating the button 222 indicated by "CURRENT POSITION" here, the film roll screen 221 is returned to the current playback position. The operation button 223 shown at the lower left of FIG. 7 may be used to select and implement operations including start to play, pause, stop, fast-forward/reverse and forward jump and reverse jump operations. A thumbnail image 231 on the film roll screen 221 may be selected to jump to the playback position at a corresponding time code and start playing by processing, which will be described later.

In step S56, the film roll playing section 112 determines whether the time of the current playback position is the time for displaying the thumbnail image of a telop image or not based on the time codes given to the thumbnail images of the film roll data 92.

If so in step S56, the film roll playing section 112 in step S57 controls the thumbnail image of the telop image of the applicable time code to display on the film roll screen 221 under the film roll display section 212 as the thumbnail image 232 in FIG. 7, for example. If not, the processing in step S55 is skipped here.

In other words, the thumbnail image 232 of a telop image is displayed on the film roll screen 221 in FIG. 7. The thumbnail image 232 of the telop image is obtained by converting the telop image 241-1 on the telop list display section 214 to the thumbnail image. If the thumbnail image 232 of the telop image on the film roll screen 221 is selected, processing, which will be described later, implements jumping to the playback position at the corresponding time code and starts playing from there, like the case of the thumbnail image 231 of the image immediately after a scene change.

In step S58, the telop data playing section 113 determines whether any one of the telop images 241 displayed on the telop list display section 214 has been selected or not based on the signal from the light receiving section 29. For example, if so in step S58, the telop data playing section 113 in step S59 accesses the telop data storage section 26, searches the telop data corresponding to the selected telop image 241 displayed on the telop list display section 214, loads the time code of the display starting time of the corresponding telop image 241 and supplies it to the image playing section 111. The image playing section 111 starts playing the contents data 91 from the playback position corresponding to the supplied time code and may display it on the image display section 211 in FIG. 7, for example.

If not in step S58, the processing in step S59 is skipped here.

In other words, in a case where the telop image 241-1 is selected in FIG. 7, for example, the playback of the contents data 91 is started from the image at the playback position corresponding to the time code 01:30:20. Thus, since the playback is started from the time when the display of the telop "STORY OF AAAA" is started if the telop image 241-1 is selected, the quick playback is allowed from the playback position where the contents relating to "STORY OF AAAA" desired by a user may be possibly displayed.

In step S60, the film roll playing section 112 determines whether the thumbnail image 231 of the image immediately after a scene change or the thumbnail image 232 of the telop image, which is displayed under the film roll display section 212, has been selected or not based on a signal from the light receiving section 29. For example, if so in step S60, the film roll playing section 112 in step S61 accesses the film roll data 92, searches the time code corresponding to the selected thumbnail image 231 or 232 displayed under the selected film roll display section 212 and supplies it to the image playing section 111. The image playing section 111 starts playing the contents data 91 from the playback position corresponding to the supplied time code and may display it as the image display section 211 in FIG. 7, for example.

If not in step S60, the processing in step S61 is skipped here.

In other words, if the thumbnail image 232 of a telop image is selected in FIG. 7, for example, the playback of the contents data 91 is started from the playback position corresponding to the time code 01:30:20, like the case where the telop image 241-1 is selected. Thus, if the telop image 241-1 is selected, the playback is started from the time where the display of the telop "STORY OF AAAA" is started. The quick playback is allowed from the playback position where the contents relating to "STORY OF AAAA" desired by a user may be possibly displayed. For example, if the thumbnail image 231 of the image immediately after a scene change is selected, the contents data 91 is started to play from the image of the playback position at the time code when the selected thumbnail image is inserted. As a result, the playback is allowed from the playback position, which can be estimated from the image immediately after the scene change.

Two kinds of thumbnail images of the thumbnail image 231 of the image immediately after a scene change, which is displayed on the film roll display section 212, and the thumbnail image 232 of a telop image are displayed like a film roll based on time codes with the advance of the playback. In this case, while the thumbnail image 231 of the image immediately after a scene change is the thumbnail image converted from an entire image, the thumbnail image 232 of a telop image is a thumbnail image converted from the image of an area displaying a telop in an image. Therefore, even when they are arranged as thumbnail images under the film roll display section 212, a user can recognize the difference at a glance. As a result, the playback position can be selected by checking the telop image and the image after a scene change.

In step S62, the contents playing section 27 determines whether the playback of contents is instructed to stop or not. If not, the processing returns to step S54. In other words, the processing in steps S54 to S62 is repeated as far as the playback is continued.

If the determination result in step S62 is yes, the processing ends.

The processing above allows selecting a playback position arbitrarily and playing from the playback position corresponding to the selected image based on the playback state of contents recognized from the thumbnail image 231 of the image immediately after a scene change or the thumbnail image 232 of a telop image, which is displayed under the film roll display section 212, or the telop image 241 displayed on the telop list display section 214. Thus, recorded contents can be played by easily and accurately locating a desired playback position.

The telop image 241 displayed on the telop list display section 214 may be reduced or enlarged to display from the size of an extracted area.

Having described that the telop image 241 and the thumbnail image 231 (or 232) distinctively for convenience, the telop image 241 may be used directly, without creating the thumbnail image 231 (or 232) from the telop image 241.

Having described that, as a method for extracting a telop, an area that does not change for a predetermined period of time in images of contents is extracted as a telop, the method for identifying a telop is not limited thereto, but other methods are applicable thereto.

Having described the example in which a button is displayed for directly selecting a telop image, the invention is not limited thereto. Text, a button or a playback time corresponding to a telop image may be displayed for selection. In other words, while the display starting time, display ending time and display period are displayed on the right side separately from the telop image 241 in FIG. 7, a new button for displaying a display starting time, display ending time and display period may be created according to the telop image 241, and the new button may be pressed for an operation of selecting the telop image.

Having described the example in which contents is played from an image including a selected telop image, the invention is not limited thereto. Contents may be played from an image before a predetermined time among images including a telop image.

A telop image may be displayed in a scrollable manner if the telop image has a predetermined width (length) or longer. Alternatively, a thumbnail image having a predetermined width (length) or longer and highlighted in response to the selection with a cursor may be displayed in a scrollable manner.

With reference to the flowchart in FIG. 8, list display processing will be described next.

In step S81, the list display control section 30 determines whether the list display has been instructed or not based on a signal obtained from the light receiving section 29 and repeats the processing until list display is instructed. If the operating section 2b is operated to instruct list display by a user, for example, in step S81, the light emitting section 2a emits the corresponding signal as a light emission signal. Here, the light receiving section 29 receives the light emission signal from the light emitting section 2a of the remote controller 2 and supplies the signal instructing list display, which corresponds to the received light signal, to the list display control section 30. In response thereto, the list display control section 30 determines that list display has been instructed, and the processing moves to step S82.

Figure 9:
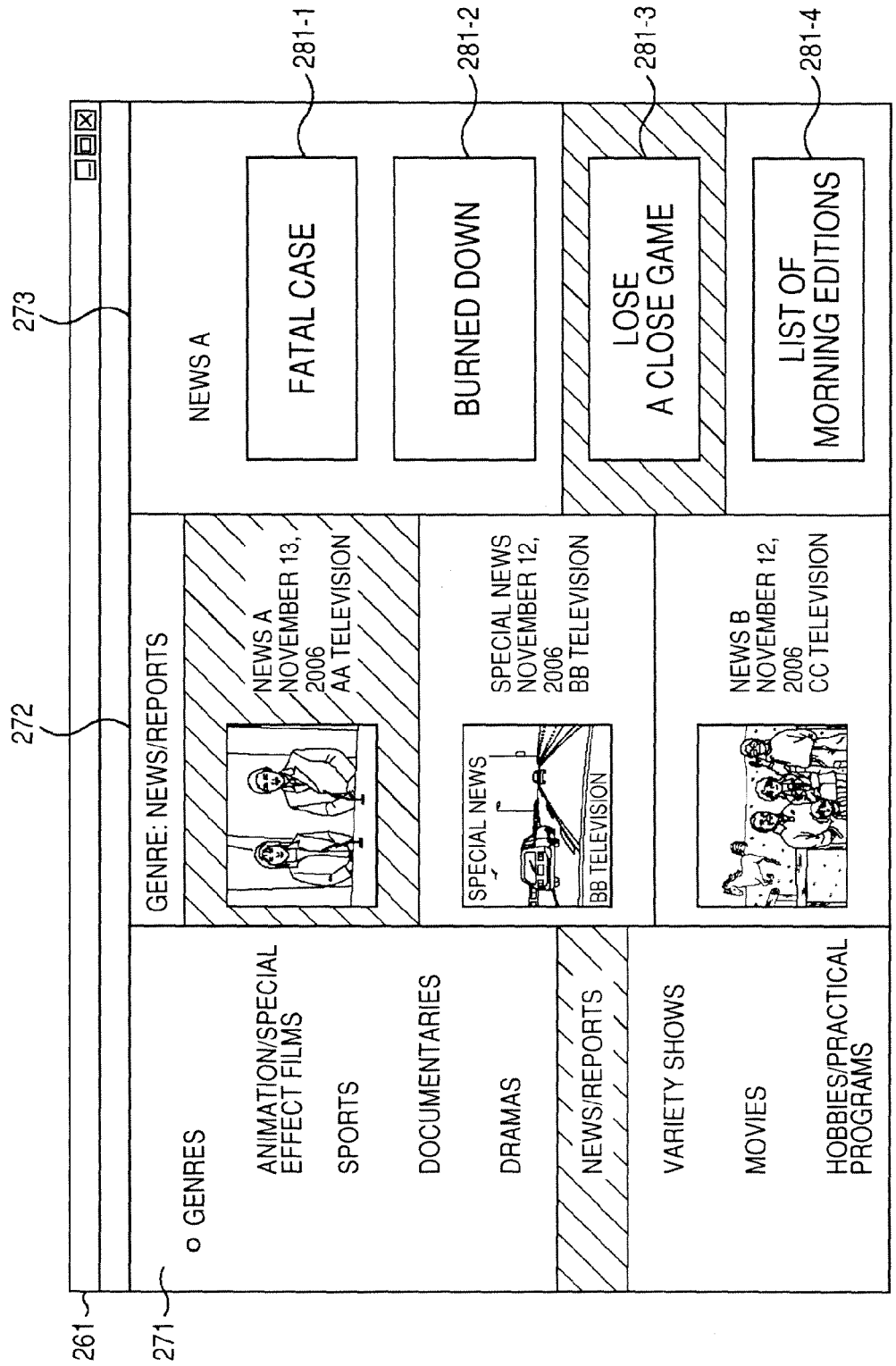
FIG. 9 is a diagram for describing an example of the window to be displayed by the list display processing.
Figure 10:
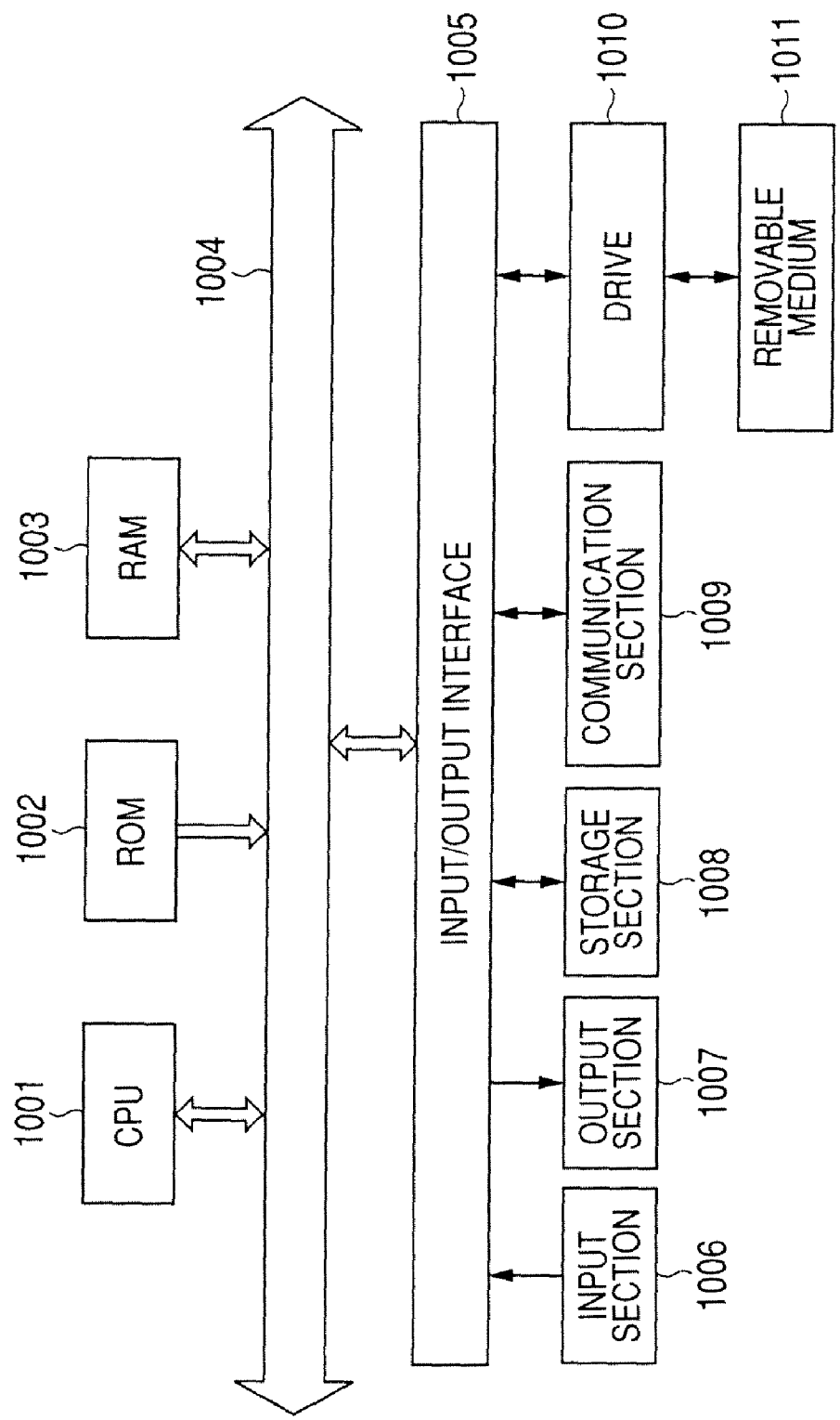
FIG. 10 is a diagram for illustrating a configuration example of a personal computer.

In step S82, the list display control section 30 controls the genre managing section 121 to display on the display section 28 a list of genres as indicated by the genre list 271 on the list 261 as shown in FIG. 9. In FIG. 9, genres "ANIMATION/SPECIAL EFFECT FILMS", "SPORTS", "DOCUMENTARIES", "DRAMAS", "NEWS/REPORTS", "VARIETY SHOWS", "MOVIES" and "HOBBIES/PRACTICAL PROGRAMS" are displayed from the top as an example of the list of genres.

In step S83, the list display control section 30 controls the contents managing section 122 to access the contents data storage section 24, load contents data under a selected genre on the genre list 271, and display it as the contents list 272 in FIG. 9 on the display section 28. In other words, since FIG. 9 shows that the genre "NEWS/REPORTS" is highlighted and selected under the selected genre list 271, contents data belonging to the genre "NEWS/REPORTS" is loaded, and a list of contents data is displayed as shown in the contents list 272 in FIG. 9. In FIG. 9, "NEWS A, Nov. 13, 2006, AA TELEVISION", "SPECIAL NEWS, Nov. 12, 2006, BB TELEVISION" and "NEWS B, Nov. 12, 2006, CC TELEVISION", are displayed from the top. FIG. 9 shows that the top contents is contents "NEWS A", which is broadcasted by the broadcast station "AA TELEVISION" on Nov. 13, 2006. The second contents is contents "SPECIAL NEWS", which is broadcasted by the broadcast station "BB TELEVISION" on Nov. 12, 2006. The bottom contents is contents "NEWS B", which is broadcasted by the broadcast station "CC TELEVISION" on Nov. 12, 2006.

In step S84, the list display control section 30 controls the telop managing section 123 to access the telop data storage section 26, load telop data of the selected contents on the contents list 272, and display it under the telop list 273 in FIG. 9 on the display section 28. In other words, since FIG. 9 shows that the contents "NEWS A" is highlighted and selected on the selected contents list 272, telop data belonging to the contents "NEWSA" is loaded, and a list of telop data is displayed for each telop image, as shown in the telop list 273 in FIG. 9. In FIG. 9, "FATAL CASE", "BURNED DOWN" "LOSE A CLOSE GAME" and "LIST OF MORNING EDITIONS" are displayed from the top. The top telop image 281-1 shows it is the time when a report relating to a fatal case is broadcasted. The second telop image 281-2 shows it is the time when a report relating to a case in which burning out has occurred is broadcasted. The third telop image 281-3 shows it is the time when a report relating to a case of losing a close game is broadcasted. The fourth telop image 281-4 shows it is the time when a report including a list of morning editions is broadcasted.

In step S85, the list display control section 30 determines whether contents has been newly selected or not. If so, the processing returns to step S84. That is, a new telop list 273 is displayed according to the new contents.

On the other hand, if not in step S85, the list display control section 30 in step S86 determines whether a genre has been newly selected or not. If so, the processing returns to step S83. That is, a new contents list 272 is displayed according to the new genre, and a new telop list 273 is further displayed.

In step S87, the list display control section 30 determines whether the playback of selected contents has been instructed or not. If the playback of the contents "NEWS A" has been instructed under the state shown in FIG. 9, for example, in step S87, the list display control section 30 in step S88 controls the playback instructing section 124 to instruct the contents playing section 27 to play the corresponding contents "NEWS A". In step S92, the list display control section 30 deletes the display of the list 261 from the display section 28. As a result, the playback processing described with reference to the flowchart in FIG. 6 is started, and the corresponding contents data is played from the beginning.

On the other hand, if the playback of selected contents has not been instructed in step S87, the list display control section 30 in step S89 determines whether the playback of contents including a selected telop image has been instructed or not. If the telop "LOSE A CLOSE GAME" highlighted and selected under the state shown in FIG. 9 is selected to instruct to play in step S89, the list display control section 30 in step S90 controls the playback instructing section 124 to instruct the contents playing section 27 to start playing the contents "NEWS A" from the corresponding playback position with the telop image 281-3 "LOSE A CLOSE GAME". Then, the processing moves to step S92. As a result, the playback processing described with reference to the flowchart in FIG. 6 is started, and the playback of corresponding contents data is started from the corresponding playback position of the telop image.

If it is determined that the playback of contents including a selected telop image has not been instructed in step S89, the list display control section 30 in step S91 determines whether the end of the list display has been instructed or not. If not, the processing returns to step S85. That is, the display of the list 261 is continued, and the processing awaits the selection of contents or a telop image.

Then, if the end of the list display has been instructed in step S89, the processing moves to step S92, and the processing returns to step S81 then.

The processing above allows listing contents for each selected genre, listing and displaying telop images of selected contents and playing selected contents or a selected telop image from the beginning or from a selected playback position in the telop image. Therefore, desired contents can be selected, and a desired playback position can be easily and accurately located in the recorded contents to play the selected contents even from the state where the playback of the contents has not been started.

By the way, the series of the steps of the image processing may be implemented not only by hardware but also by software. In order to implement the series of the steps by software, a program included in the software may be installed from a recording medium to a computer built in special hardware or to a generic personal computer, which can implement a function by installing an applicable program thereto.

Figure 8:
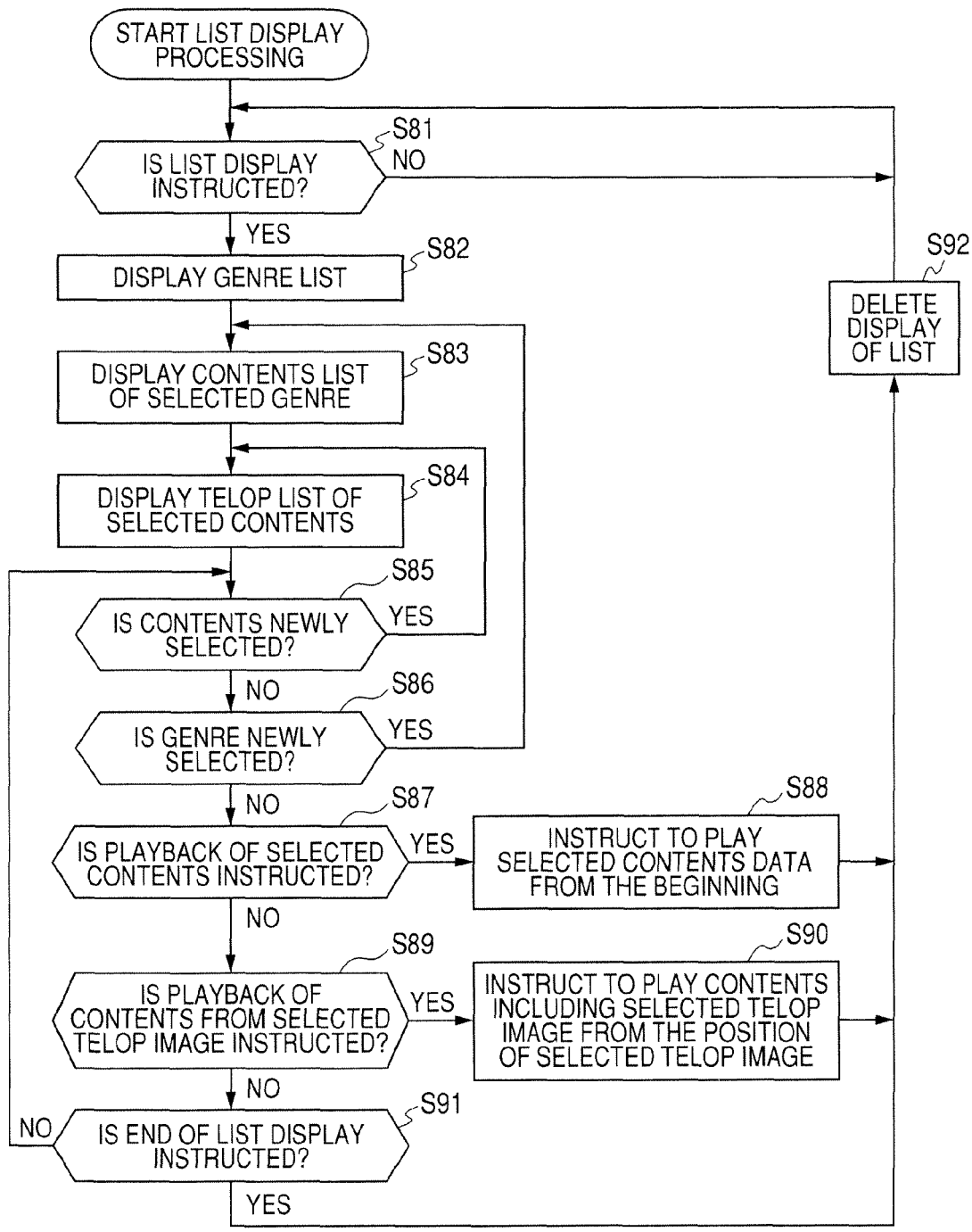
FIG. 8 is a flowchart describing list display processing.

FIG. 8 shows a configuration example of a generic personal computer. The personal computer internally includes a CPU (central processing unit) 1001. An input/output interface 1005 is connected to the CPU 1001 via a bus 1004. A ROM (read only memory) 1002 and a RAM (random access memory) 1003 are connected to the bus 1004.

An input section 1006, an output section 1007, a storage section 1008 and a communication section 1009 are connected to the input/output interface 1005. The input section 1006 includes an input device such as a keyboard and a mouse for inputting an operation command by a user. The output section 1007 outputs a processing operation screen or an image of a processing result to a display device. The storage section 1008 includes a hard disk drive storing a program and/or data. The communication section 1009 includes a LAN (local area network) adapter and implements communication processing over a network such as the Internet typically. A drive 1010 is connected to the input/output interface 1005. The drive 1010 reads/writes data from/to a removable medium 1011 such as a magnetic disk (including a flexible disk), an optical disk (including a CD-ROM (compact disk read only memory) and a DVD (digital versatile disc)), a magnetooptical disk (including an MD (mini disc)) and a semiconductor memory.

The CPU 101 impalements processing according to a program stored in the ROM 1002 or a program loaded from the removable medium 1011 such as a magnetic disk, an optical disk, a magnetooptical disk and a semiconductor memory, installed to the storage section 1008 and loaded from the storage section 1008 to the RAM 1003. The RAM 1003 may store data for implementing processing by the CPU 1001.

The steps describing a program to be recorded in a recording medium includes not only processing to be performed chronologically in the described order but also processing to be performed in parallel or separately instead of the chronological implementation of processing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
area image extracting means for extracting, as a telop image, an area displaying a telop in video contents;
detecting means for detecting a scene change in images of the video contents;
recording means for converting an image at the time when a scene change in the video contents is detected by the detecting means to a thumbnail image and recording the thumbnail image;
display control means for controlling to arrange and display a plurality of the thumbnail images and a plurality of the telop images chronologically, the display control means displaying a play start time and a play end time for each telop image next to a corresponding telop image; and
playing means for playing the video contents from the position corresponding to the selected thumbnail image or telop image.

2. The information processing apparatus according to claim 1, wherein the area image extracting means extracts, as a telop image, the image of an area that does not change for a predetermined period of time in a predetermined range in images of the video contents.

3. The information processing apparatus according to claim 1, wherein the display control means controls to display the video contents being currently played and the telop image on one screen.

4. The information processing apparatus according to claim 1, wherein the display control means controls to display the telop image corresponding to the selected contents in a plurality of video contents pieces.

5. The information processing apparatus according to claim 1, wherein the display control means controls to move and display the thumbnail image and the telop image in synchronization with the playback of the video contents.

6. An information processing method comprising the steps of:
extracting, as a telop image, an area displaying a telop in video contents;
detecting a scene change in images of the video contents;
converting, using a processor, an image at the time when a scene change in the video contents is detected by the detecting to a thumbnail image and recording the thumbnail image;
controlling to arrange and display a plurality of the thumbnail images and a plurality of the telop images chronologically, the controlling including displaying a play start time and a play end time for each telop image next to a corresponding telop image; and
playing the video contents from the position corresponding to the selected thumbnail image or telop image.

7. The information processing method according to claim 6, wherein the controlling controls to display the telop image corresponding to the selected video contents in a plurality of video contents pieces.

8. The information processing method according to claim 6, wherein the controlling controls to move and display the thumbnail image and the telop image in synchronization with the playback of the video contents.

9. A non-transitory computer readable medium encoded with a program which, when loaded on a computer, causes the computer to perform a method comprising:
extracting, as a telop image, an area displaying a telop in video contents;
detecting a scene change in images of the video contents;
converting an image at the time when a scene change in the video contents is detected by the detecting to a thumbnail image and recording the thumbnail image;
controlling to arrange and display a plurality of the thumbnail images and a plurality of the telop images chronologically, the controlling including displaying a play start time and a play end time for each telop image next to a corresponding telop image; and
playing the video contents from the position corresponding to the selected thumbnail image or telop image.

10. The non-transitory computer readable medium according to claim 9, wherein the controlling controls to display the telop image corresponding to the selected video contents in a plurality of video contents pieces.

11. The non-transitory computer readable medium according to claim 9, wherein the controlling controls to move and display the thumbnail image and the telop image in synchronization with the playback of the video contents.

12. An information processing apparatus comprising:
an area image extracting unit configured to extract, as a telop image, an area displaying a telop in video contents;
a detecting unit configured to detect a scene change in images of the video contents;
a recording unit configured to convert an image at the time when a scene change in the video contents is detected by the detecting unit to a thumbnail image and recording the thumbnail image;
a display control unit configured to control to arrange and display a plurality of the thumbnail images and a plurality of the telop images chronologically, the display control unit displaying a play start time and a play end time for each telop image next to a corresponding telop image; and
a playing unit configured to play the video contents from the position corresponding to the selected thumbnail image or telop image.

13. The information processing apparatus according to claim 12, wherein the display control unit displays a play direction for each telop image next to a corresponding telop image.

14. The information processing apparatus according to claim 1, wherein the display control means displays a play direction for each telop image next to a corresponding telop image.

15. The information processing method according to claim 6, wherein the controlling displays a play direction for each telop image next to a corresponding telop image.

16. The non-transitory computer readable medium according to claim 9, wherein the controlling displays a play direction for each telop image next to a corresponding telop image.

* * * * *